(12) United States Patent
Söderdahl

(10) Patent No.: US 7,975,814 B2
(45) Date of Patent: Jul. 12, 2011

(54) METHOD FOR ARRANGING A SEPARATING PISTON IN A CAVITY AND A DEVICE WITH SUCH A SEPARATING PISTON

(75) Inventor: Johan Söderdahl, Stockholm (SE)

(73) Assignee: Ohlins Racing AB, Upplands Vasby (SE)

( * ) Notice: Subject to any disclaimer, the term of this patent is extended or adjusted under 35 U.S.C. 154(b) by 388 days.

(21) Appl. No.: 12/064,231

(22) PCT Filed: Aug. 17, 2006

(86) PCT No.: PCT/SE2006/000951
§ 371 (c)(1),
(2), (4) Date: Mar. 3, 2008

(87) PCT Pub. No.: WO2007/021233
PCT Pub. Date: Feb. 22, 2007

(65) Prior Publication Data
US 2008/0230336 A1    Sep. 25, 2008

(30) Foreign Application Priority Data

Aug. 19, 2005  (SE) .................................... 0501836-1

(51) Int. Cl.
*F16F 9/00* (2006.01)
(52) U.S. Cl. ........................................ 188/318; 188/317
(58) Field of Classification Search .................. 188/312, 188/314–318, 322.21, 322.2, 322.22; 29/890.06, 29/888.04, 888.041, 888.042, 888.044; 92/8, 92/9, 12, 82, 143; 280/89, 90, 271, 272, 280/771
See application file for complete search history.

(56) References Cited

U.S. PATENT DOCUMENTS 1,898,335 A * 2/1933 Bates ............................ 267/226
(Continued)

FOREIGN PATENT DOCUMENTS

GB     1 206 752 A     9/1970
(Continued)

OTHER PUBLICATIONS

International Search Report received in corresponding PCT Application No. PCT/SE2006/000951, mailed Nov. 17, 2006, 3 pages.

*Primary Examiner* — Bradley T King
*Assistant Examiner* — Stephen Bowes
(74) *Attorney, Agent, or Firm* — Knobbe Martens Olson & Bear, LLP

(57) ABSTRACT

A steering damper system and method of regulating the fluid pressure of such a system are provided. The system can comprise a piston rod, a cylinder, a passage, and a damper portion. The damper portion can comprise a damper cavity, an outer piston, an inner piston, and a biasing component. The damper cavity can be in fluid communication with the passage. The outer piston can be slidably disposed in the damper cavity and define a chamber and a duct that is in fluid communication with the chamber and the passage. The inner piston can be slidably disposed in the chamber of the outer piston. The biasing component can exert an axial biasing force against the inner piston for regulating the pressure of fluid disposed in the system passing intermediate the passage, the damper cavity, and the chamber of the outer piston.

17 Claims, 3 Drawing Sheets

U.S. PATENT DOCUMENTS

| | | | | |
|---|---|---|---|---|
| 1,965,473 A | * | 7/1934 | Lucien | 188/299.1 |
| 3,103,993 A | * | 9/1963 | Gies | 188/274 |
| 3,470,986 A | * | 10/1969 | Whisler | 188/269 |
| 4,153,237 A | * | 5/1979 | Supalla | 267/64.15 |
| 4,880,213 A | * | 11/1989 | Shinbori et al. | 267/64.27 |
| 4,890,822 A | * | 1/1990 | Ezure et al. | 267/64.23 |
| 5,042,781 A | * | 8/1991 | Ezure et al. | 267/64.23 |
| 5,398,787 A | * | 3/1995 | Woessner et al. | 188/266.6 |
| 5,730,261 A | * | 3/1998 | Spakowski et al. | 188/266.6 |

FOREIGN PATENT DOCUMENTS

| | | | |
|---|---|---|---|
| JP | 04088232 A | * | 3/1992 |

* cited by examiner

METHOD FOR ARRANGING A SEPARATING PISTON IN A CAVITY AND A DEVICE WITH SUCH A SEPARATING PISTON

CROSS REFERENCE TO RELATED APPLICATIONS

This application claims the benefit and priority to and is a U.S. National Phase of PCT International Application Number PCT/SE2006/000951, filed on Aug. 17, 2006, designating the United States of America and published in the English language, which claims priority under 35 U.S.C. §119 to Swedish Application Number 0501836-1, filed on Aug. 19, 2005, the disclosures of the each of which are hereby incorporated by reference in their entireties.

BACKGROUND OF THE INVENTION

1. Field of the Invention

The present invention relates, among other things, to a method for arranging a separating piston in a system cavity where a liquid medium is sealed off and separated from a second medium, for example, a gas, by means of the separating piston.

The invention also relates to a device with a separating piston in a system cavity, for example, a steering damper cavity, where the piston seals off and separates a liquid medium from a second medium, for example, a gas.

2. Description of the Related Art

When arranging a separating piston in a cavity, the separating piston should be positioned in the cavity at an initial position such that it can carry out its function with regard to maintaining the pressure within a predetermined pressure range. The system and the device must be able to compensate for changes in volume as a result of changes in temperature, leakage, etc, so that the system, the steering damper, etc, has the same damping characteristics in spite of the said varying factors.

Setting the initial position of the separating piston in the cavity is critical and has hitherto involved a complicated method. In order to set the initial position using this method, one is required to use a special tool. Further, it is necessary to empty the system of the liquid medium in order to carry out the setting. In the case of replacement or repair of a separating piston in an existing system that is in use, this means that the whole system must be emptied of liquid in order to carry out the replacement or repair.

SUMMARY OF THE INVENTION

The objects of the present invention are, among other things, directed at providing an improved method of arranging a separating piston in a cavity and setting an initial position of the piston. Further, an object of the present invention is to facilitate non-critical setting of the initial position of the separating piston without draining liquid from the system. Accordingly, the separating piston can be given an initial position that takes into account any variations in pressure between the upper and lower sides of the separating piston resulting from the said temperature variations, leakage, etc.

In an embodiment of the method, a liquid medium is introduced into a cavity. Further, a first part of a separating piston is lowered into the cavity filled with a liquid medium in a direction towards the inner part of the cavity. A second part of the separating piston can then be lowered into the cavity and is caused to interact with the first part of the piston by the application of an interaction force, for example via an actuating area located on the second piston. A volume of liquid is thereby confined between the parts of the piston by this interaction. Following this interaction, the second part of the piston is subjected to continued downward-pressing forces with the result that parts of the second piston are urged to continue to penetrate into the first part of the piston.

Accordingly, at least a portion of the confined volume of liquid is forced out into another cavity under the first part of the separating piston through a passage in the first part of the separating piston. At this point, the volume of liquid thus forced out acts upon a lower area of the first part which can be larger than a lower area of the second part of the separating piston. As a result of the difference in area between the in the surface area of the lower area of the first part and the lower area of the second piston, the downward-pressing force causes the first part of the piston to move upwards in relation to the second part of the separating piston. The relative motion can be ended when the first and second parts are pressed together into a final position, so that the separating piston as such is at a distance from the inner parts of the other cavity. A biasing mechanism, for example a mechanical spring, can then be arranged to act on the separating piston at an upper part of the second part of the separating piston.

Accordingly, an embodiment of the method is provided through which the pressure of a fluid in a steering damper system can be regulated. The method can comprise the steps of: filling a damper cavity with the fluid; placing an outer piston into the damper cavity such that the outer piston is slidably disposed in the damper cavity and forms a fluid-tight seal with an interior surface of the damper cavity, the outer piston defining a chamber and a duct that is in fluid communication with the chamber and the fluid in the system; moving the outer piston downwardly into the damper cavity such that the outer piston is submerged in the fluid, the fluid passing through the duct in the outer piston and into and above the chamber of the outer piston; placing an inner piston into the chamber of the outer piston such that the inner piston is slidably disposed in the chamber of the outer piston and forms a fluid-tight seal with an interior surface of the chamber; exerting an axial force against the inner piston such that fluid disposed in the chamber of the outer piston is urged into the damper cavity through the duct of the outer piston and until a lower surface of the inner piston contacts a stop surface of the chamber of the outer piston; and biasing at least a portion of the inner piston against a portion of the damper cavity.

The method can also comprise positioning the outer and inner pistons at a given distance above a bottom surface of the damper cavity after the lower surface of the inner piston contacts the stop surface of the chamber of the outer piston. Further, the step of biasing at least a portion of the inner piston can comprise inserting a spring into the damper cavity. In addition, the method can also comprise biasing the spring against an internal surface of a closure part that is connected to the damper cavity for closing the damper cavity. The method can also comprise the step of adjusting an available volume of the system using a pressure regulation device. In such an embodiment, the system can comprise a passage that is in fluid communication with the damper chamber, and the pressure regulation device can be operative to vary the volume of the passage.

An embodiment of a device according to the invention can comprise a separating piston having first and second parts. The first part can be arranged to be able to be inserted into a liquid medium towards an inner part of a cavity. The second part can similarly be arranged to be inserted into the liquid medium and can be partially pressed down, by downward-pressing forces, into the first part of the piston.

In the partially pressed-down position of the second part, the first and second parts of the piston can contain a volume of liquid medium in a chamber of the first part. The first part can be provided with a passage leading from the chamber in a direction towards the inner part of the cavity. The passage can be arranged to allow all or part of the confined volume of liquid medium to pass through as a result of the downward-pressing forces on the second part of the piston. In this regard, the first part can have a lower area and the second part can have a downward-pressing lower area which presses the fluid downwardly. The lower area of the first part can be larger than the lower area of the second part. As such, the downward-pressing forces can cause the volume of liquid medium that has been forced out of the chamber to make contact with the lower area of the first part and hence cause the first part of the piston to move from the inner part of the cavity towards the second part of the piston to a final combined position. The final combined position for the parts of the piston can be at a distance from the inner part of the cavity. In order to maintain the downward-pressing forces and pressurization of the liquid medium, the second piston can interact with a biasing mechanism.

In further developments of the concept of the invention, the first part of the piston can be tubular and the chamber can be an inner cavity that receives at least a portion of the second part of the piston. An end part of the first part of the piston can comprise the passage in the form of a central hole that extends through the first part of the piston, and the first part of the piston can have a seal at the end part that can interact with an inner wall of the cavity. The end part can have the lower area on its outside.

The second part of the piston can be arranged to be inserted in the inner cavity of the first part of the piston and can be sealed against the inner wall of this cavity by means of a sealing arrangement. In an additional embodiment, the actuating area of the second piston can comprise an outer flange surface, upon which the biasing mechanism can be arranged or can make contact. Further, in some embodiments, the biasing mechanism can be in form of a mechanical spring. In addition, the second part of the piston can have a central part that extends upwards.

Furthermore, the distance of the final combine position of the parts of the separating piston from the inner part of the cavity can be selected to ensure that the separating piston carries out movements within the system cavity within the limits in which the separating piston is to operate. A considerable part or all of the confined volume of liquid medium can have been forced out of the chamber of the first part through the passage when the downward-pressing forces cause the parts of the piston to assume a completely combined, final, or pressed-together position. At its outer end surface, the first piston can have a peripheral contact surface that can make contact with a corresponding stop surface in the inner part of the system cavity, and the inner part can have an opening that is opposite the central hole in the first part of the piston, into which the confined volume of the liquid medium is initially able to be forced down.

In an embodiment of the device, a steering damper system is provided that can comprise a piston rod and a damper module. The piston rod can comprise an elongate shaft, a piston component and a mounting section. The piston component can be fixed along the shaft of the piston rod and define a diameter larger than a diameter of the shaft.

The damper module can comprise a cylinder, a passage, a pressure regulation portion, and a damper portion. The cylinder can define top and bottom ends and can be configured with the piston rod being slidably disposed therein. The cylinder can define an inner surface having a diameter greater than the diameter of the piston component to form a seal with the piston component. The cylinder can define upper and lower sections. The upper section can be that portion of the cylinder intermediate the piston component and the top end of the cylinder. The lower section can be that portion of the cylinder intermediate the piston component and the bottom end of the cylinder.

The passage can be in fluid communication with the upper and lower sections of the cylinder, the passage defining a volume. The pressure regulation portion can be in communication with the passage and being operative to modify the volume of the passage for regulating the pressure of a fluid disposed within the passage and the upper and lower sections of the cylinder.

The damper portion can comprise a damper cavity, a separating piston component and a biasing component. The separating piston component can be slidably disposed within the damper cavity to define first and second sections of the damper cavity. The second section of the damper cavity can be in fluid communication with the passage. The separating piston component can comprise outer and inner parts. The outer part can be slidably disposed within the damper cavity and can be configured to form a seal with an inner surface of the damper cavity. The outer part can comprise an interior chamber and a duct. The duct can be in fluid communication with the interior chamber of the outer part and the second section of the damper cavity. The inner part of the separating piston component can be slidably disposed within the interior chamber of the outer part of the separating piston component and can be configured to form a seal with an inner surface of the interior chamber. The biasing component can be disposed in the first section of the damper portion and can bias the inner part of the separating piston component against the damper portion.

In some embodiments, the outer and inner parts of the separating piston component can each define a bottom surface, and the bottom surface of the outer part can have a larger surface area than the bottom surface of the inner part. Further, an axial force exerted against the inner part in the direction of the second section of the damper cavity can cause movement of the inner part relative to the outer part and movement of the outer part relative to the damper cavity. The axial force can also cause the inner part to move in the direction of the second section of the damper cavity and the outer part to move in the direction of the first section of the damper cavity.

It is contemplated that the second section of the damper cavity of the damper portion can be filled with the fluid. Accordingly, the biasing component can bias the inner part to maintain the pressure of the fluid in the damper system. The biasing element can be a spring. Further, the inner part of the separating piston component can define an actuating area upon which the spring can exert an axial force. The inner part of the separating piston component can also have a central part that extends upwardly, and the central part can be configured to stabilize the biasing component. Finally, the interior cavity of the outer part of the separating piston component can define a stop surface. The stop surface can be configured to contact the bottom surface of the inner part of the separating piston component for limiting the movement of the inner part relative to the outer part of the separating piston component.

In accordance with yet another embodiment, a steering damper system is provided that comprises a piston rod, a cylinder, a passage, and a damper portion. The piston rod can comprise an elongate shaft, a piston component and a mounting section. The piston component can be fixed along the shaft of the piston rod. The cylinder can be configured with the piston rod slidably disposed therein and forming a seal between the piston component and an interior surface of the cylinder. The cylinder can be configured with the piston component being interposed between upper and lower sections of the cylinder. The passage can be in fluid communication with the upper and lower sections of the cylinder.

The damper portion can comprise a damper cavity, an outer piston, an inner piston, and a biasing component. The damper cavity can be in fluid communication with the passage. The outer piston can be slidably disposed in the damper cavity and define a chamber and a duct that is in fluid communication with the chamber and the passage. The inner piston can be slidably disposed in the chamber of the outer piston. The biasing component can exert an axial biasing force against the inner piston. Accordingly, the axial biasing force can bias the inner piston for regulating the pressure of fluid disposed in the system passing intermediate the passage, the damper cavity, and the chamber of the outer piston.

In variations of such an embodiment, the chamber of the outer piston can defines a stop surface, and the stop surface can be configured to contact a bottom surface of the inner piston for limiting the movement of the inner part relative to the outer piston. The inner piston can also have a central part that extends upwardly, and the central part can be configured to stabilize the biasing component. The passage can define a volume and the system can further comprise a pressure regulation portion in communication with the passage, the pressure regulation portion and being operative to modify the volume of the passage for regulating the pressure of the fluid in the system.

By means of what is proposed above, a reliably-operating and advantageously-constructed separating piston can be obtained. Further, in spite of the fact that the system can comprises two parts of a piston, it can be constructed in such a way that the parts of the piston maintain their relative positions in a combined position as a result of the ratio of their areas. The system can be filled with liquid when the piston is inserted and the distance to the inner parts can be given a value that enables the separating piston to operate within fixed or predetermined limit values in, preferably, a steering damper.

BRIEF DESCRIPTION OF THE DRAWINGS

The abovementioned and other features, aspects and advantages of the inventions disclosed herein are described in detail below with reference to the drawings of the preferred embodiments. The illustrated embodiments are intended to illustrate, but not to limit the inventions. The drawings contain the following figures.

DETAILED DESCRIPTION OF THE PREFERRED EMBODIMENT

Figure 1:
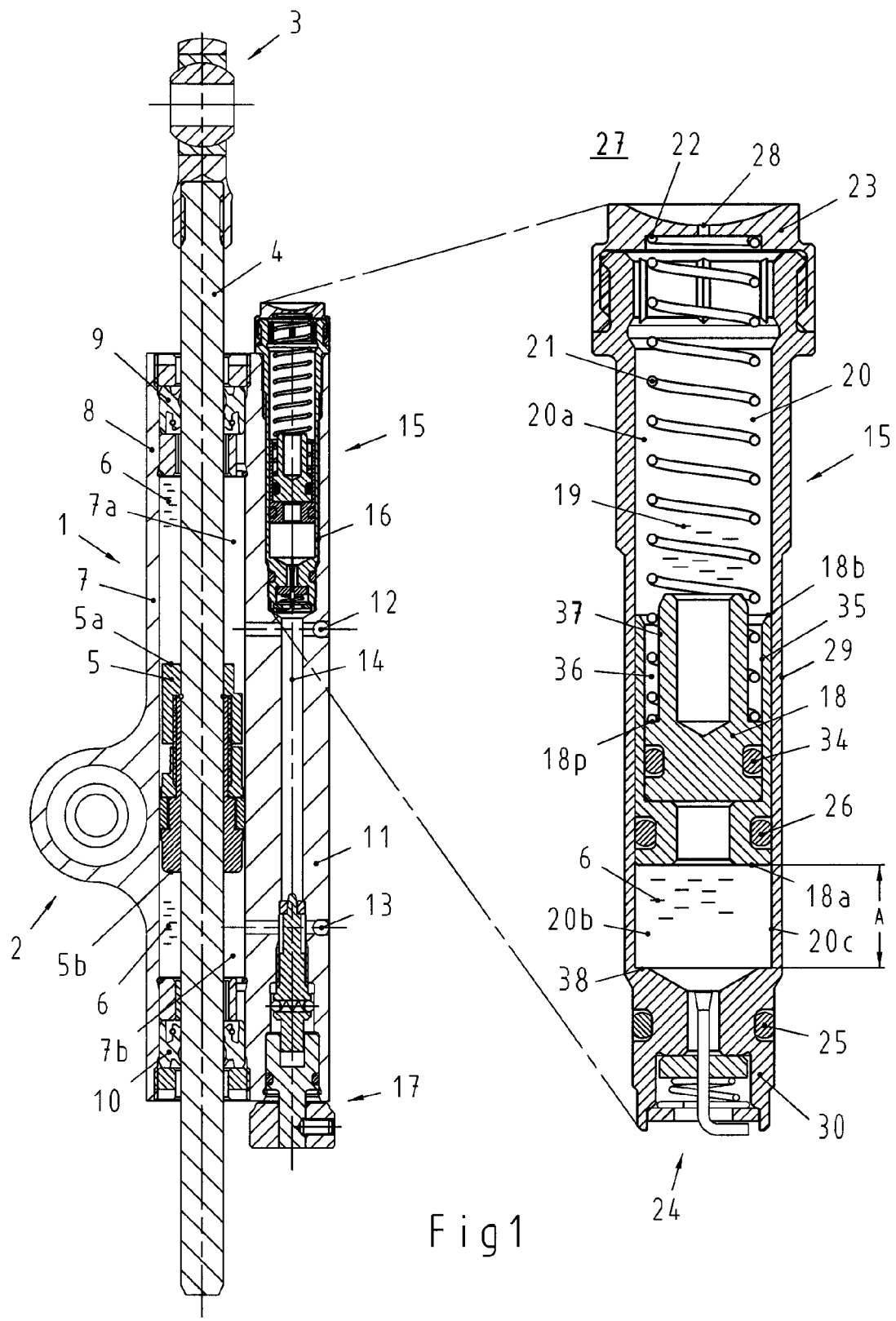
FIG. 1 is a vertical cross-sectional view of a steering damper that is arranged and configured in accordance with certain features, aspects and advantages of the present invention.

FIG. 1 shows an embodiment of a steering damper 1 that is arranged and configured in accordance with certain features, aspects and advantages of the present invention. The basic construction of the steering damper 1 can be of a known type and, for example, consists of the Ohlins SD100 or SD200 steering damper sold on the general market by the applicant of the present patent application.

The steering damper can comprise one or more mounting devices 2 for mounting the steering damper 1 onto the handlebars of a motorcycle, cycle, etc, (not shown in FIG. 1). In addition, other mounting devices 3 can be provided for mounting the steering damper 1 to the frame or chassis of the vehicle (not shown).

The steering damper preferably comprises a piston rod 4 extending in the longitudinal direction of the damper 1 that has a mounting device 3 at one end. A piston (or piston arrangement) 5 can be fixed on the piston rod 4. The piston 5 preferably operates in a liquid medium 6 that has been introduced into the cavity 7 of the steering damper 1. The cavity 7, the piston rod 4 and the piston 5 can be operatively associated with a part 8, such as a cylinder, in or on which a mounting device 2 can be arranged. The piston rod 4 is preferably positioned and arranged so that it passes through the ends of the part 8 and has sealing devices 10 that allow a movement between the rod and the part 8.

The steering damper 1 can also comprise a unit 11 that can be connected to the part 8. The unit 11 can comprise a duct system with ducts 12, 13 and 14 that make possible for liquid to pass between the upper and lower sides 5a and 5b of the piston 5. In other words, the duct system can connect the partial cavity 7a above the piston 5 with the partial cavity 7b below the piston 5.

In accordance with the illustrated embodiment, the unit 11 can also comprise a reservoir for a unit 15, such as a damper portion. The reservoir can assist in maintaining the pressure of the liquid and ensuring that the steering damper 1 can retain its damping characteristics within predetermined variations in temperature, in the event of minor leakage in the steering damper 1, etc.

In FIG. 1, a unit 15' is also shown enlarged and in a protruding position. The unit 11 has a longitudinal opening 16, in which the unit 15 (or 15') can be mounted. The unit 11 can also be provided with a pressure-regulating device 17 of a known type.

The unit 15, 15' shows a piston arrangement (or separating piston) 18 that operates between the liquid 6 (for example hydraulic oil) in the steering damper 1 (the system) on the underside 18a of the separating piston and a gaseous medium 19, (for example air), on the upper side 18b of the separating piston. The unit 15, 15' can define a cavity 20, and the cavity 20 can define partial cavities 20a and 20b in which gas and liquid mediums can be received.

In the embodiment shown in FIG. 1, a spring 21 can be operatively connected to the separating piston of the separating piston 18. The spring 21 can comprise a spiral spring, and in the example illustrated in FIG. 1, the spring 21 can be in contact with an actuating area 18p of the separating piston. The spring 21 can be attached between the actuating area 18p and an internal surface 22 on a part (a nut) 23. The part 23 can serve to close the cavity 20. Accordingly, the separating piston 18 can operate against the effect of the spring 21. Nevertheless, the operation or biasing force of the spring can also be achieved by other means and arrangements.

At its other end, the unit 15, 15' can be provided with a connecting arrangement 24 for connecting the partial cavity 20b to the duct arrangement of the unit 11. At one end, the unit 15, 15' can have a sealing element 25 that seals the unit against an inner surface on the cavity 16. The separating piston 18 can also be provided with a sealing element 26 that seals off the unit against an inner surface 20c in the cavity 20. The cavity 20a can be connected to the surrounding atmosphere 27 via a passage (hole) 28. The passage 28 can be, for example, disposed in the nut 23 that is connected to the unit 15, 15' in such a way that it forms a seal. A (tubular) part, which surrounds the cavity 20 and the separating piston 18, is indicated by 29.

Figure 2A:
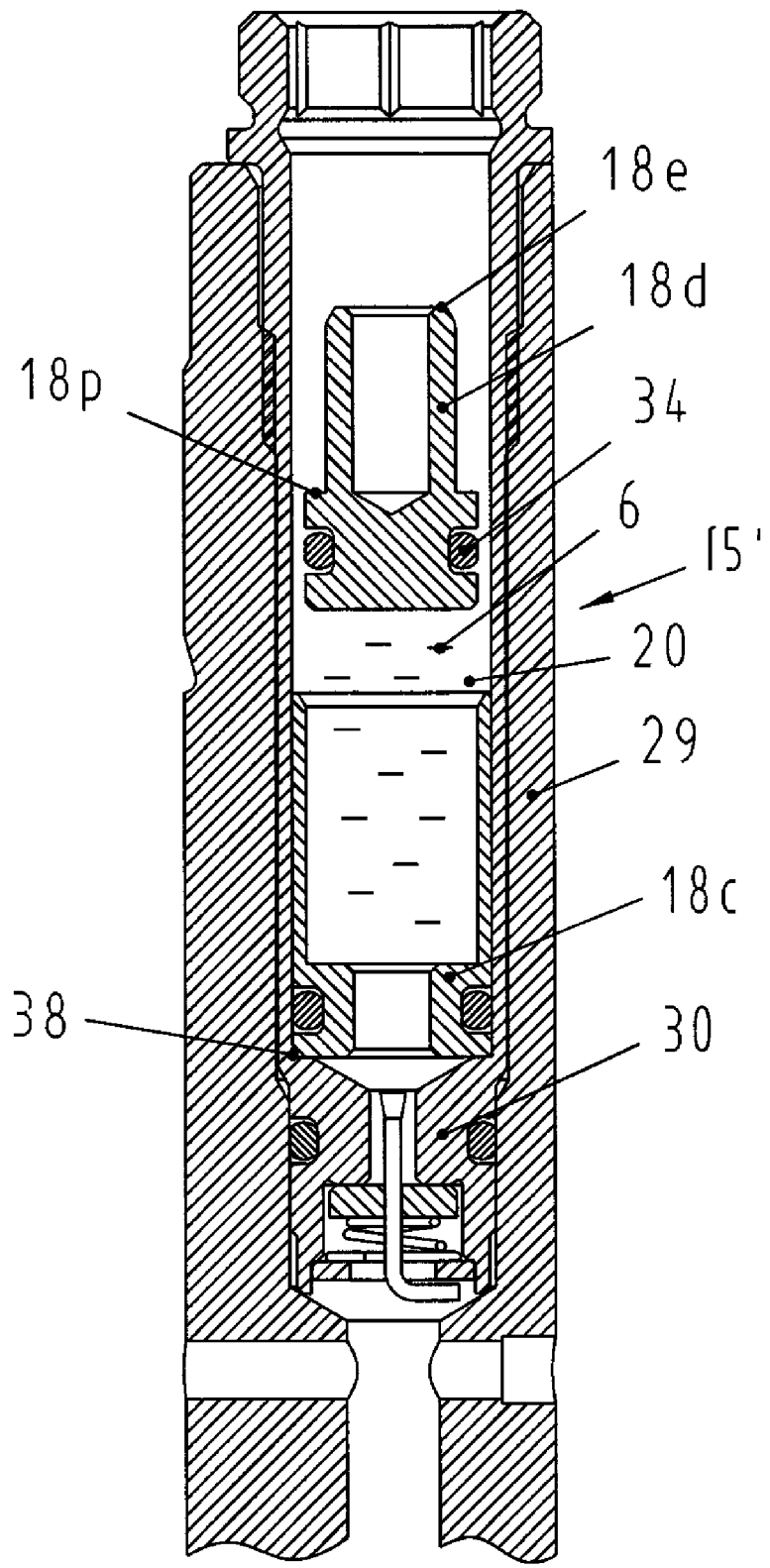
FIGS. 2a-2b are vertical cross-sectional views of parts of an accumulator comprised in the steering damper according to FIG. 1, in which the parts of the piston assume different positions in relation to each other when the method is implemented.
Figure 2B:
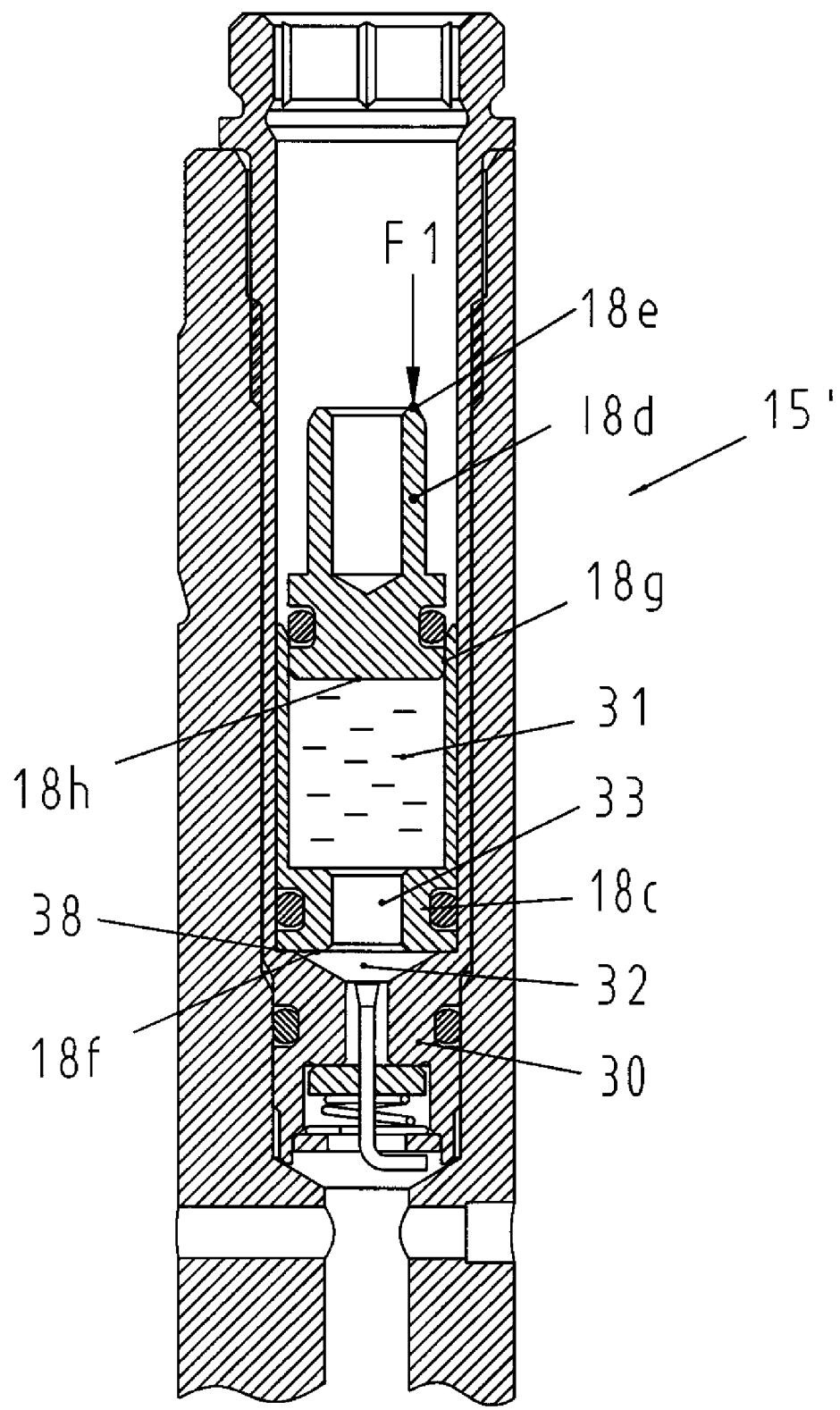

FIGS. 2a and 2b show the assembly and the arrangement for the construction of the separating piston 18 in greater detail. A method of operating the steering damper to set an initial position of the separating piston 18 can be considered to work in three steps or phases, with FIG. 2a showing the first step, FIG. 2b showing the second step and FIG. 1 showing the third step.

In accordance with such an embodiment of the present invention, a method for providing a steering damper will now be described with reference to FIGS. 1-2b. In a first step, illustrated in FIG. 2a, a liquid medium 6 can be introduced or will have been introduced into the cavity 20. As illustrated, the separating piston 18 can comprise first and second parts 18c, 18d. The first part 18c of the separating piston 18 can be inserted down into the liquid medium in a direction towards the inner part 30 of the cavity 20. The first part 18c of the separating piston 18 can define a lower area 18f on the underside 18a of the separating piston 18.

In a second step, illustrated in FIG. 2b, the second part 18d of the separating piston 18 can be inserted down into the cavity 20. The second part 18d of the piston 18 can then be caused to interact with the first part 18c of the separating piston 18 by the application of an interaction force F1 via an actuating area 18e and/or 18p located on the second piston. A volume 31 of the liquid 6 can thereby be confined between the first and second parts 18c, 18d of the separating piston 18 by the interaction.

In a third step, illustrated in FIG. 1, the second part 18d of the piston 18 can be subjected to downward pressing forces, via the actuating area 18e and/or 18p, that correspond to or exceed the said forces F1.

Application of this downward-pressing force F1 can overcome of the friction forces between the first part 18c and the second part 18d of the separating piston 18. Thus, parts 18g of the second part 18d of the separating piston 18 are urged to continue to be inserted into the first part 18c of the separating piston 18.

As a result of the application of the downward-pressing force F1, a portion of the confined volume of liquid 31 is forced out into the cavity 32 below the first part 18c of the separating piston 18 via a passage 33 in the first part 18c. The volume of liquid that is forced into the cavity 32 acts upon a lower area 18f of the first part 18c of the separating piston 18. The lower area 18f of the second part 18d of the separating piston 18 is larger than down-ward pressed area 18h of the first part 18c of the separating piston 18. As a result of the difference in area of the downward pressed area 18h and the lower area 18f, the first part 18c of the separating piston 18 will be caused to move upwards in relation to the second part 18d of the separating piston 18 by the downward-pressing force F1. Finally, as illustrated in FIG. 1, continued application of the downward-pressing force F1 can cause the first part 18c of the separating piston 18 to reach a final position in which the first part 18dc is pressed together with the second part 18d of the separating piston 18. In such a position, the separating piston 18 may be located as such is at a distance A from the inner parts of the cavity 20.

The spring 21 can thereafter be set or positioned onto the unit 15 to act against the separating piston 18. For example, in some embodiments, the spring 21 can be operatively associated with the upper part 18e of the second part 18d of the separating piston 18 or with the actuating area 18p of the second part 18d, which can be located on the upper part 18e.

Further, the second part 18d of the separating piston 18 can have a sealing arrangement 34 for sealing the second part 18d of the separating piston 18 against an inner surface 35 of an inner cavity 36 of the first part 18c of the separating piston 18.

In accordance with the illustrated embodiment, the second part 18d of the separating piston 18 can also have an internal guide 37 for the spring 21. The spring 21 can therefore extend down between the guide 37 and an inner wall in the first part 18c of the separating piston 18 to interact with the actuating area 18p. In this manner, guide 37 can facilitate control of the spring 21.

The embodiment illustrated in FIGS. 1-2b illustrates that when inserted into the liquid 6, the separating piston 18 can comprise first and second parts 18c, 18d of the separating piston 18 that can be pressed together. The ratio of the downward pressed area 18h and the lower area 18f is preferably selected in such a way that the relative combined positions established at the time of the insertion are retained when the force of the spring 21 is applied.

Further, the embodiment can be configured such that before the second part 18d of the separating piston 18 is inserted into the first part 18c of the separating piston 18, the lower area 18a of the first 18c piston part can rest on a stop surface 38 of the inner part 30. While the second part 18d is being inserted, the first part 18c of the separating piston 18 can be raised from the inner parts 30 of the cavity 20 by the distance A. This can ensure pressurization and may provide the same damping characteristics in the damper irrespective of variations in temperature, leakage, etc.

Finally, the inner part 30 of the cavity 20 can also include an opening/cavity 32 that is opposite the central hole 33 in the first part of the piston 18c, in which the confined volume 31 is initially able to be forced down. In an embodiment, the whole confined volume 31 can be initially forced out between the first and second parts 18c, 18d of the separating piston 18. In accordance with another embodiment, the upper part of the second part 18d of the separating piston 18 can be provided without the guide 37. In yet another embodiment, the second part 18d of the separating piston 18 does not need to be pressed into the first part 18c of the separating piston 18 but can be positioned or disposed over the first part 18c of the separating piston 18 and hence confine a volume in a corresponding way.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments can be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The invention claimed is:

1. A steering damper system comprising:
    a piston rod comprising an elongate shaft, a piston component and a mounting section, the piston component being fixed along the shaft of the piston rod and defining a diameter larger than a diameter of the shaft; and a damper module comprising:

a cylinder defining top and bottom ends, the cylinder being configured with the piston rod being slidably disposed therein, the cylinder defining an inner surface having a diameter greater than the diameter of the piston component to form a seal with the piston component, the cylinder defining upper and lower sections, the upper section being that portion of the cylinder intermediate the piston component and the top end of the cylinder, the lower section being that portion of the cylinder intermediate the piston component and the bottom end of the cylinder;

a passage being in fluid communication with the upper and lower sections of the cylinder, the passage defining a volume;

a pressure regulation portion being in communication with the passage and being operative to modify the volume of the passage for regulating the pressure of a fluid disposed within the passage and the upper and lower sections of the cylinder; and a damper portion comprising a damper cavity, a separating piston component and a biasing component, the separating piston component being slidably disposed within the damper cavity to define first and second sections of the damper cavity, the second section of the damper cavity being in fluid communication with the passage, the separating piston component comprising outer and inner parts, the outer part being slidably disposed within the damper cavity and being configured to form a seal with an inner surface of the damper cavity, the outer part comprising an interior chamber and a duct, the duct being in fluid communication with the interior chamber of the outer part and the second section of the damper cavity, the inner part of the separating piston component being slidably disposed within the interior chamber of the outer part of the separating piston component and being configured to form a seal with an inner surface of the interior chamber, the biasing component being disposed in the first section of the damper portion and biasing the inner part of the separating piston component against at least a portion of the damper module.

2. The steering damper system of claim 1, wherein the outer and inner parts of the separating piston component each define a bottom surface, the bottom surface of the outer part having a larger surface area than the bottom surface of the inner part.

3. The steering damper system of claim 2, wherein an axial force exerted against the inner part in the direction of the second section of the damper cavity causes movement of the inner part relative to the outer part and movement of the outer part relative to the damper cavity.

4. The steering damper system of claim 3, wherein the axial force causes the inner part to move in the direction of the second section of the damper cavity and the outer part to move in the direction of the first section of the damper cavity.

5. The steering damper system of claim 1, wherein the second section of the damper cavity of the damper portion is filled with the fluid.

6. The steering damper system of claim 5, wherein the biasing component biases the inner part to maintain the pressure of the fluid in the damper system.

7. The steering damper system of claim 1, wherein the biasing element is a spring.

8. The steering damper system of claim 7, wherein the inner part of the separating piston component defines an actuating area upon which the spring can exert an axial force.

9. The steering damper system of claim 1, wherein the inner part of the separating piston component has a central part that extends upwardly, the central part being configured to stabilize the biasing component.

10. The steering damper system of claim 1, wherein the interior cavity of the outer part of the separating piston component defines a stop surface, the stop surface being configured to contact the bottom surface of the inner part of the separating piston component for limiting the movement of the inner part relative to the outer part of the separating piston component.

11. The steering damper system of claim 1, wherein the damper cavity is offset with respect to the cylinder.

12. The steering damper system of claim 1, wherein the passage and the damper cavity are disposed external to the cylinder.

13. A steering damper system comprising:

a piston rod comprising an elongate shaft, a piston component and a mounting section, the piston component being fixed along the shaft of the piston rod;

a cylinder being configured with the piston rod slidably disposed therein and forming a seal between the piston component and an interior surface of the cylinder, the cylinder configured with the piston component being interposed between upper and lower sections of the cylinder;

a passage being in fluid communication with the upper and lower sections of the cylinder; and a damper portion comprising:

a damper cavity in fluid communication with the passage;

an outer piston slidably disposed in the damper cavity and defining a chamber and a duct, the duct being in fluid communication with the chamber and the passage;

an inner piston slidably disposed in the chamber of the outer piston; and a biasing component exerting an axial biasing force against the inner piston;

wherein the passage and the damper cavity are disposed external to the cylinder, and wherein the axial biasing force biases the inner piston for regulating the pressure of fluid disposed in the system passing intermediate the passage, the damper cavity, and the chamber of the outer piston.

14. The steering damper system of claim 13, wherein the chamber of the outer piston defines a stop surface, the stop surface being configured to contact a bottom surface of the inner piston for limiting the movement of the inner part relative to the outer piston.

15. The steering damper system of claim 13, wherein the inner piston has a central part that extends upwardly, the central part being configured to stabilize the biasing component.

16. The steering damper system of claim 13, wherein the passage defines a volume and the system further comprises a pressure regulation portion in communication with the passage, the pressure regulation portion being operative to modify the volume of the passage for regulating the pressure of the fluid in the system.

17. The steering damper system of claim 13, wherein the damper cavity is offset with respect to the cylinder.

* * * * *